United States Patent
Holladay et al.

(10) Patent No.: US 7,930,720 B2
(45) Date of Patent: Apr. 19, 2011

(54) DISTRIBUTION SYSTEM AND METHOD

(75) Inventors: Eythan Christopher Holladay, Marietta, GA (US); Stephen Eric Jaffe, Canton, GA (US); Michael Patrick Outlaw, Dallas, GA (US); Patrick James Richards, Jr., Marietta, GA (US); Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1269 days.

(21) Appl. No.: 11/178,076

(22) Filed: Jul. 8, 2005

(65) Prior Publication Data

US 2007/0011707 A1    Jan. 11, 2007

(51) Int. Cl.
*H04N 7/18* (2006.01)

(52) U.S. Cl. .................. 725/74; 725/78; 725/82; 705/10

(58) Field of Classification Search .................. 725/100, 725/131–134, 151–153
See application file for complete search history.

(56) References Cited

U.S. PATENT DOCUMENTS

| | | | | |
|---|---|---|---|---|
| 5,351,075 A | * | 9/1994 | Herz et al. | 725/13 |
| 6,049,332 A | * | 4/2000 | Boetje et al. | 715/721 |
| 6,141,530 A | * | 10/2000 | Rabowsky | 725/116 |
| 6,384,893 B1 | * | 5/2002 | Mercs et al. | 352/133 |
| 6,700,640 B2 | | 3/2004 | Morley et al. | |
| 6,812,994 B2 | * | 11/2004 | Bubie et al. | 725/74 |
| 6,829,033 B2 | * | 12/2004 | Hose et al. | 725/116 |
| 2002/0026645 A1 | * | 2/2002 | Son et al. | 725/117 |
| 2002/0069107 A1 | * | 6/2002 | Werner | 705/14 |
| 2002/0108111 A1 | * | 8/2002 | Cezeaux et al. | 725/39 |
| 2003/0086023 A1 | * | 5/2003 | Chung et al. | 725/142 |
| 2004/0103444 A1 | * | 5/2004 | Weinberg et al. | 725/132 |
| 2004/0158865 A1 | * | 8/2004 | Kubler et al. | 725/82 |
| 2004/0194128 A1 | | 9/2004 | McIntyre et al. | |
| 2004/0216163 A1 | * | 10/2004 | Whitcomb | 725/74 |
| 2005/0057724 A1 | * | 3/2005 | Patton et al. | 352/40 |

* cited by examiner

*Primary Examiner* — Brian T Pendleton
*Assistant Examiner* — Fernando Alcon
(74) *Attorney, Agent, or Firm* — Schmeiser, Olsen & Watts; Anna L. Linne (57) ABSTRACT

A distribution system and method. The distribution system comprises a computing apparatus and a plurality of projection systems connected to the computing apparatus. The computing apparatus comprises a scheduler software tool and a plurality of audio/video data files stored on a computer readable medium. Each projection system of the plurality of projection systems comprises a cache storage device connected to an associated projection apparatus. Each cache storage device is adapted to dynamically receive and store an associated audio/video data file from the plurality of audio/video data files for transmission to each associated projection apparatus according to a schedule generated by the scheduler software tool.

26 Claims, 4 Drawing Sheets

DISTRIBUTION SYSTEM AND METHOD

BACKGROUND OF THE INVENTION

1. Technical Field

The present invention relates to a distribution system and associated method for scheduling audio/video data files for broadcasting.

2. Related Art

Distributing data across a system to various parties typically requires a distribution schedule. Therefore there exists a need for a creating a distribution schedule for distributing data across a system to various parties.

SUMMARY OF THE INVENTION

The present invention provides a distribution system, comprising:

a computing apparatus comprising a scheduler software tool and a plurality of audio/video data files stored on a computer readable medium; and a plurality of projection systems connected to said computing apparatus, each projection system of said plurality of projection systems comprising a cache storage device connected to an associated projection apparatus, each said cache storage device being adapted to dynamically receive and store an associated audio/video data file from said plurality of audio/video data files for transmission to each said associated projection apparatus according to a schedule generated by said scheduler software tool.

The present invention provides a distribution method, comprising:

providing a computing apparatus and a plurality of projection systems connected to said computing apparatus, said computing apparatus comprising a scheduler software tool and a plurality of audio/video data files stored on a computer readable medium, each projection system of said plurality of projection systems comprising a cache storage device connected to an associated projection apparatus;

generating by said scheduler software tool, a schedule for said plurality of audio/video data files;

dynamically receiving and storing by each said cache storage device, an associated audio/video data file from said plurality of audio/video data files according to said schedule;

transmitting by each said cache storage device to each said associated projection apparatus, each said associated audio/video data file according to said schedule.

The present invention provides a process for integrating computing infrastructure, comprising integrating computer-readable code into a computer system, wherein the code comprises a scheduler software tool, wherein the computer system comprises a computing apparatus and a plurality of projection systems connected to said computing apparatus, wherein the computing apparatus comprises said scheduler software tool and a plurality of audio/video data files stored on a computer readable medium, wherein each projection system of said plurality of projection systems comprises a cache storage device connected to an associated projection apparatus, and wherein the code in combination with the computer system is capable of performing a method comprising:

generating by said scheduler software tool, a schedule for said plurality of audio/video data files;

dynamically receiving and storing by each said cache storage device, an associated audio/video data file from said plurality of audio/video data files according to said schedule;

transmitting by each said cache storage device to each said associated projection apparatus, each said associated audio/video data file according to said schedule.

The present invention provides a computer program product, comprising a computer usable medium having a computer readable program code embodied therein, said computer readable program code comprising a scheduler software tool and an algorithm adapted to implement a distribution method within a computing system, said computing system comprising a computing apparatus and a plurality of projection systems connected to said computing apparatus, wherein the computing apparatus comprises said scheduler software tool and a plurality of audio/video data files stored on a computer readable medium, wherein each projection system of said plurality of projection systems comprises a cache storage device connected to an associated projection apparatus, said method comprising:

generating by said scheduler software tool, a schedule for said plurality of audio/video data files;

dynamically receiving and storing by each said cache storage device, an associated audio/video data file from said plurality of audio/video data files according to said schedule;

transmitting by each said cache storage device to each said associated projection apparatus, each said associated audio/video data file according to said schedule.

The present invention advantageously provides a system and associated method to create a distribution schedule for distributing data across a system to various parties.

BEST MODE FOR CARRYING OUT THE INVENTION

Figure 1:
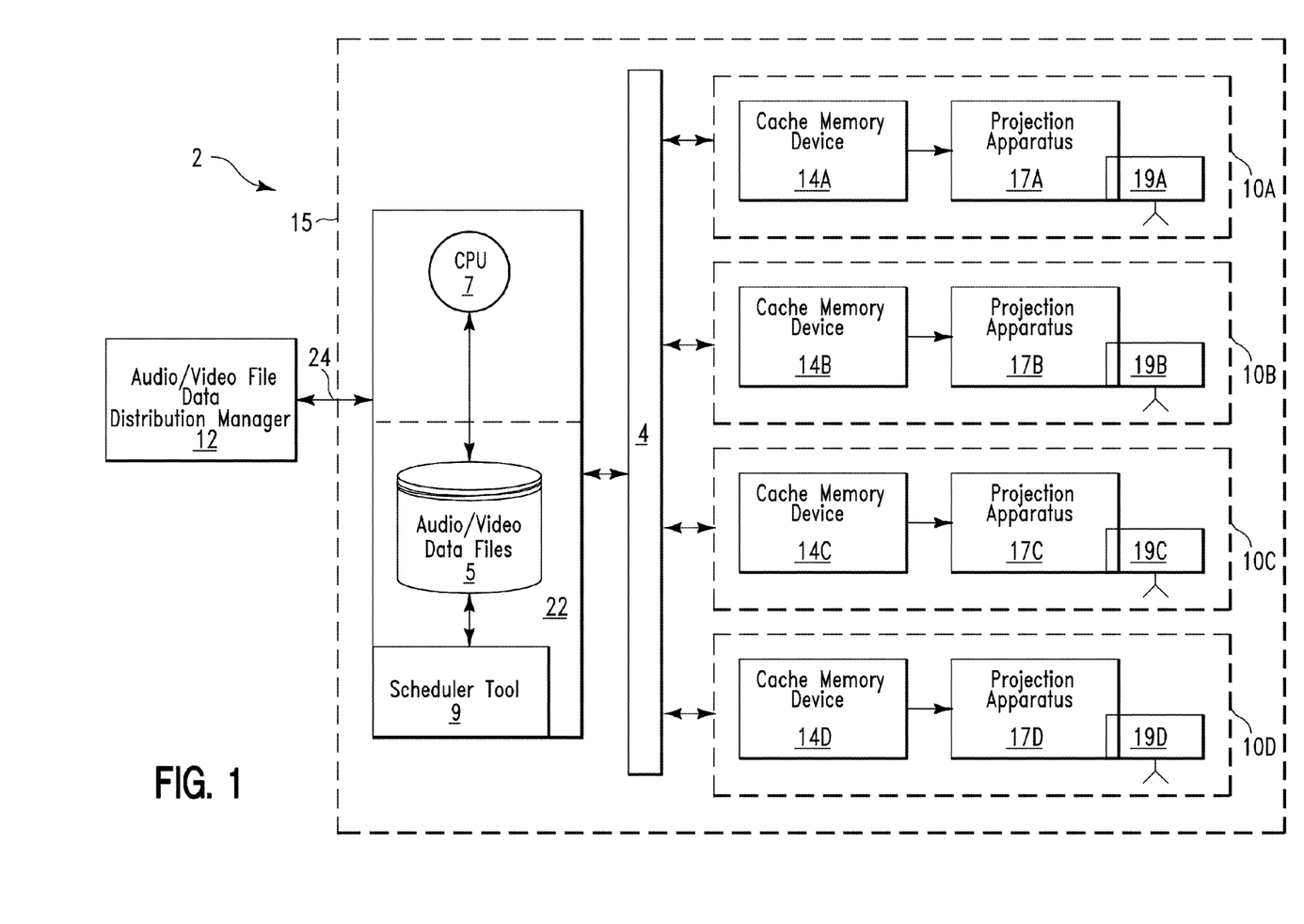
FIG. 1 illustrates a block diagram view of a distribution system for receiving, storing, scheduling, and broadcasting audio/video data files for multiple audiences, in accordance with embodiments of the present invention.

FIG. 1 illustrates a block diagram view of a distribution system 2 for receiving, storing, scheduling, and broadcasting audio/video data files 5 for multiple audiences, in accordance with embodiments of the present invention. Audio/video data files 5 may comprise any type of audio/video data files including, inter alia, movies, digital movies, etc. Distribution system 2 comprises an audio/video data file distribution manager 12 and a theater system 15. Theater system 15 comprises a computing apparatus 11, an interface 4, and projection systems 10A . . . 10D. Audio/video data file distribution manager 12 is a provider for the audio/video data files 5. For example, audio/video data file distribution manager 12 may be a movie distribution center (i.e., for distributing movies from a movie studio to theaters). Audio/video data file distribution manager 12 is connected to the computing apparatus 11 through a network connection 24 such as, inter alia, the Internet, an intranet, etc. Computing apparatus 11 comprises a central processing unit (CPU) 7 and a memory structure 22. Upon a request from theater system 15 (e.g., a manager for theater system 15 requests the audio/video data files 5), audio/video data file distribution manager 12 transfers audio/video data files 5 over network connection 24 to computing apparatus 11. Computing apparatus 11 stores audio/video data files 5 in memory structure 22. Computing apparatus 11 is connected through interface 4 to each of and projection systems 10A . . . 10D. Interface 4 may comprise any type of interface including, inter alia, a local area network (LAN), a wide area network (WAN), the Internet, etc. Each of projection systems 10A . . . 10D comprises a cache memory device 14A . . . 14D connected to an associated projection apparatus 17A . . . 17D. Each of projection systems 10A . . . 10D are for receiving and projecting (i.e., broadcasting) each of audio/video data files 5. Each projection apparatus 17A . . . 17D may comprise any type of projection apparatus including, inter alia, a movie projector with an audio amplification means, a digital movie projector with a digital decoding means (i.e., for decoding digital audio/video files) and an audio amplification means. A digital decoding means may alternatively be located in computing device 11. Each associated projection apparatus 17A . . . 17D is for amplifying an audio component from each of audio/video data files 5 and projecting a video component from each of audio/video data files 5. Each of projection systems 10A . . . 10D additionally comprises an associated video monitor 19A . . . 19D (e.g., a movie screen) for displaying a video component from each of audio/video data files 5. Projection systems 10A . . . 10D and computing device 11 may be located in a same general location (e.g., a same building) while each of projection systems 10A . . . 10D are located in individual rooms. For example, projection systems 10A . . . 10D and computing device 11 may be located in a theater complex comprising a plurality of individual projection rooms. Each of the projection rooms may comprise one of projection systems 10A . . . 10D.

Upon a request from a manager of theater system 15, audio/video data file distribution manager 12 transfers audio/video data files 5 over network connection 24 to computing apparatus 11. Computing apparatus 11 stores audio/video data files 5 in memory structure 22. Individual audio/video data files from audio/video data files 5 are allocated to each of projection systems 10A . . . 10D in each of the projection rooms for specified viewings by associated audiences according to a schedule. The schedule is generated by a scheduler tool 9 located in memory structure 22. Scheduler tool 9 is executed by the CPU to dynamically schedule (i.e., initially) and reschedule individual audio/video data files for allocation to associated projection systems 10A . . . 10D for specified viewings by associated audiences. The initial schedule is generated using input data related each of audio/video data files 5. The input data may comprise general information related to each audio/video data file of audio/video data files 5 including, inter alia, a movie title, a time duration for each audio/video data file, a motion picture rating, etc. The initial schedule comprises scheduled projection (i.e., viewing by an audience) times and specified projection systems 10A . . . 10D for each of audio/video data files 5. Upon conclusion of a first set of projections or broadcasts (i.e., for audience viewings) for each of audio/video data files 5 in each of projection systems 10A . . . 10D, scheduler tool 9 re-evaluates the initial schedule based on data related to the first set of projections (i.e., past audience viewings for each of audio/video data files 5). Scheduler tool 9 may modify the initial schedule (i.e., reschedule audio/video data files 5 with respect to projection systems 10A . . . 10D) based on the data related to the first set of projections for each of audio/video data files 5. The data related to past viewings for each of audio/video data files 5 may comprise ticket sales for the first set of projections for each of audio/video data files 5 (i.e., past audience size). The initial schedule may allocate each audio/video data file 5 to a projection system 10A . . . 10D for real time viewings (i.e., audio/video data files 5 are passed through a cache memory device 14A . . . 14D to a projection apparatus 17A . . . 17D for an immediate viewing by an audience). Alternatively, the initial schedule may allocate each of audio/video data files 5 to a projection system 10A . . . 10D for storage in an associated cache memory device 14A . . . 14D until a scheduled viewing time. A same audio/video data file 5 may be scheduled for allocation to more than one of projection systems 10A . . . 10D. Additionally, a same audio/video data file 5 may be scheduled for allocation to more than one of projection systems 10A . . . 10D for viewing by different audiences at different times. Alternatively, a different audio/video data file 5 may be scheduled for allocation to each of projection systems 10A . . . 10D. Individual audio/video data files 5 that have been scheduled and allocated to any of projection systems 10A . . . 10D may be rescheduled by scheduler tool 9 and transferred between cache memory devices 14A . . . 14D according to data related to past viewings for each of audio/video data files 5. For example, in a theater complex, movie A (i.e., an audio/video data file 5) has been allocated and scheduled for projection system 10A (i.e., theater A) comprising an audience capacity of 100 (people) and movie B (i.e., a different audio/video data file 5) has been allocated and scheduled for projection system 10B (i.e., theater B) comprising an audience capacity of 500 (people). Movie A is stored in cache memory device 14A and movie B is stored in cache memory device 14 B. Based on past viewing audience sizes (e.g., past ticket sales), movie A (in theater A with a capacity of 100 people) has been selling out very quickly and movie B (in theater B with a capacity of 500 people) has very small audiences (i.e., under 100 people). Scheduler tool 9, using this information (past audience sizes), reschedules and reallocates movie A to projection system 10B (i.e., theater B,) and reschedules and reallocates movie B to projection system 10A (i.e., theater A) to match the larger theater with the larger audience size. Therefore, movie A will be transferred from cache memory device 14A to cache memory device 14B for projection in projection system 10B and movie B will be transferred from cache memory device 14B to cache memory device 14A for projection in projection system 10A. Any rescheduled audio/video data file 5 may be transferred between any of cache memory devices 14A . . . 14D. Alternatively, any rescheduled audio/video data file 5 may be transferred between any of cache memory devices 14A . . . 14D and memory structure 22. Scheduler tool 9 allows for scheduling and rescheduling any of audio/video data files 5 dynamically based on various factors (e.g., past ticket sates).

Figure 2:
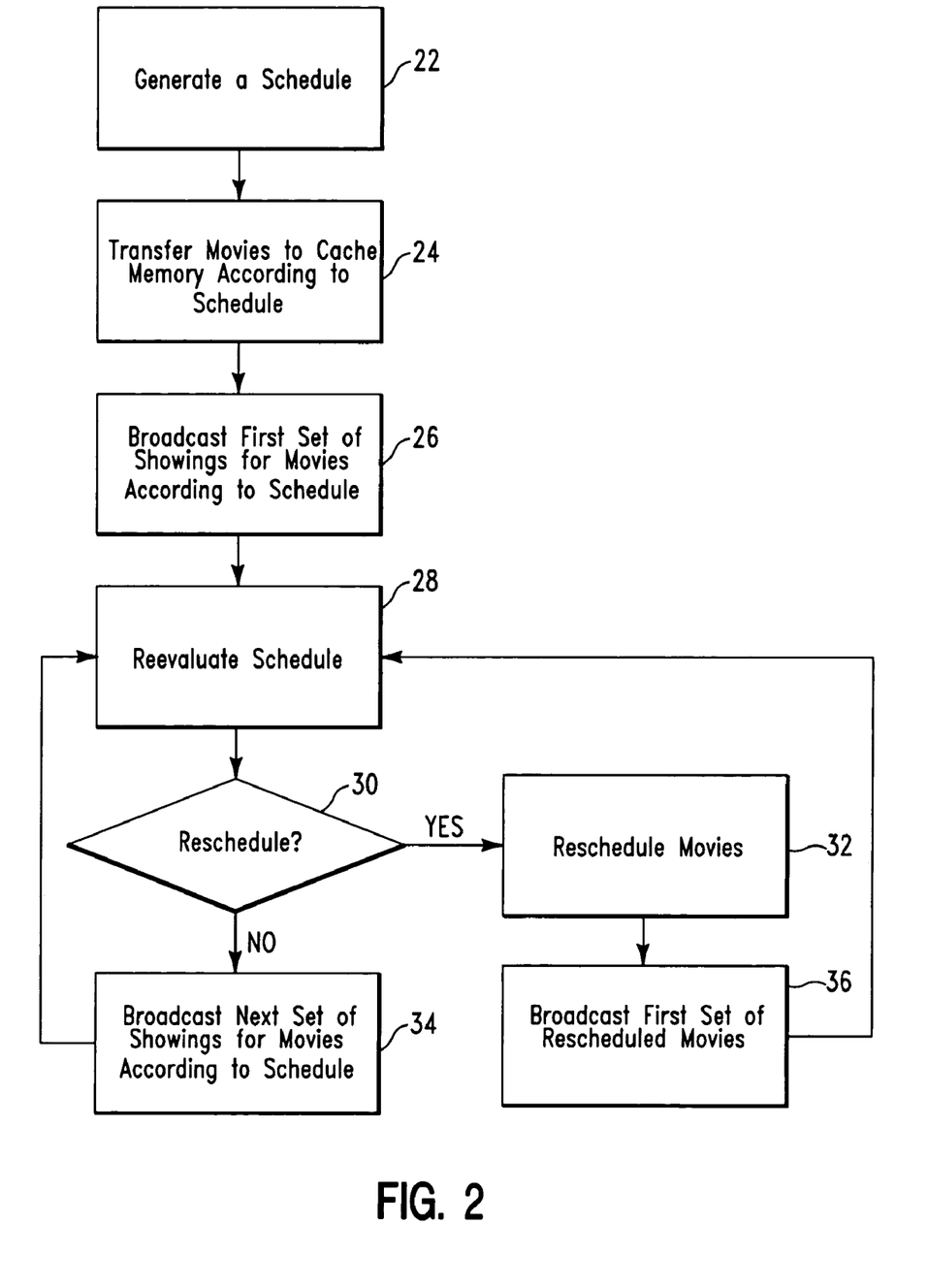
FIG. 2 illustrates an algorithm used by the theater system of FIG. 1 to schedule each of the audio/video data files, in accordance with embodiments of the present invention

FIG. 2 illustrates an algorithm used by theater system 15 of FIG. 1 to schedule each of audio/video data files 5, in accordance with embodiments of the present invention. In FIG. 2 each of audio/video data files 5 (from FIG. 1) comprises a movie and each of projection systems 10A . . . 10D (from FIG. 1) is located in a separate theater. In step 22, scheduler tool 9 generates a schedule each movie. The schedule comprises show time and theater allocation for each movie. The schedule is generated using input data related each of the movies. The input data may comprise general information related to each of the movies including, inter alia, a title for each movie, a time duration for each movie, a rating for each movie, etc. For example, a movie with a mature audience rating (e.g., rated R for restricted audience) may be scheduled for an evening show time while a movie with a younger audience rating (e.g., G for general audience) may be scheduled for a matinee show time. In step 24, movies are transferred from memory structure 22 to each of cache memory devices 14A ... 14D according to the schedule generated in step 22. In step 26, each of the movies in each of cache memory devices 14A ... 14D is transmitted to each associated projection apparatus 17A ... 17D (i.e., at specified times according to the schedule) to execute a first set of showings (i.e., for audiences) for each of the movies in each of cache memory devices 14A ... 14D. Each of cache memory devices 14A ... 14D along with each associated projection apparatus 17A ... 17D is located in a separate theater. In step 28, upon conclusion of the first set of showings, scheduler tool 9 reevaluates the schedule based on data related to the first set of showings for each of the movies. The data related to the past showings for each of audio/video data files 5 may comprise ticket sales for the first set of showings (i.e., audience sizes). In step 30, an option is given to reschedule movies (i.e., show times and theater allocations) based on the reevaluation of the schedule.

If in step 30, any movies are to be rescheduled then in step 32 movies selected for rescheduling are rescheduled. Rescheduling may include, inter alia, changing show times and transferring selected movies between theaters (i.e., selected movies for rescheduling are transferred between cache memory devices 14A ... 14D). In step 36, a first set of rescheduled movies are transmitted to each associated projection apparatus 17A ... 17D to execute a first set of rescheduled showings (i.e., for audiences). Upon completion of the first set of rescheduled showings the algorithm loops back to step 28.

If in step 30, there are not any movies are to be rescheduled then in step 34 a next set of originally scheduled movies are transmitted to each associated projection apparatus 17A ... 17D to execute the next set of originally scheduled showings (i.e., for audiences). Upon completion of the next set of scheduled showings the algorithm loops back to step 28.

Figure 3:
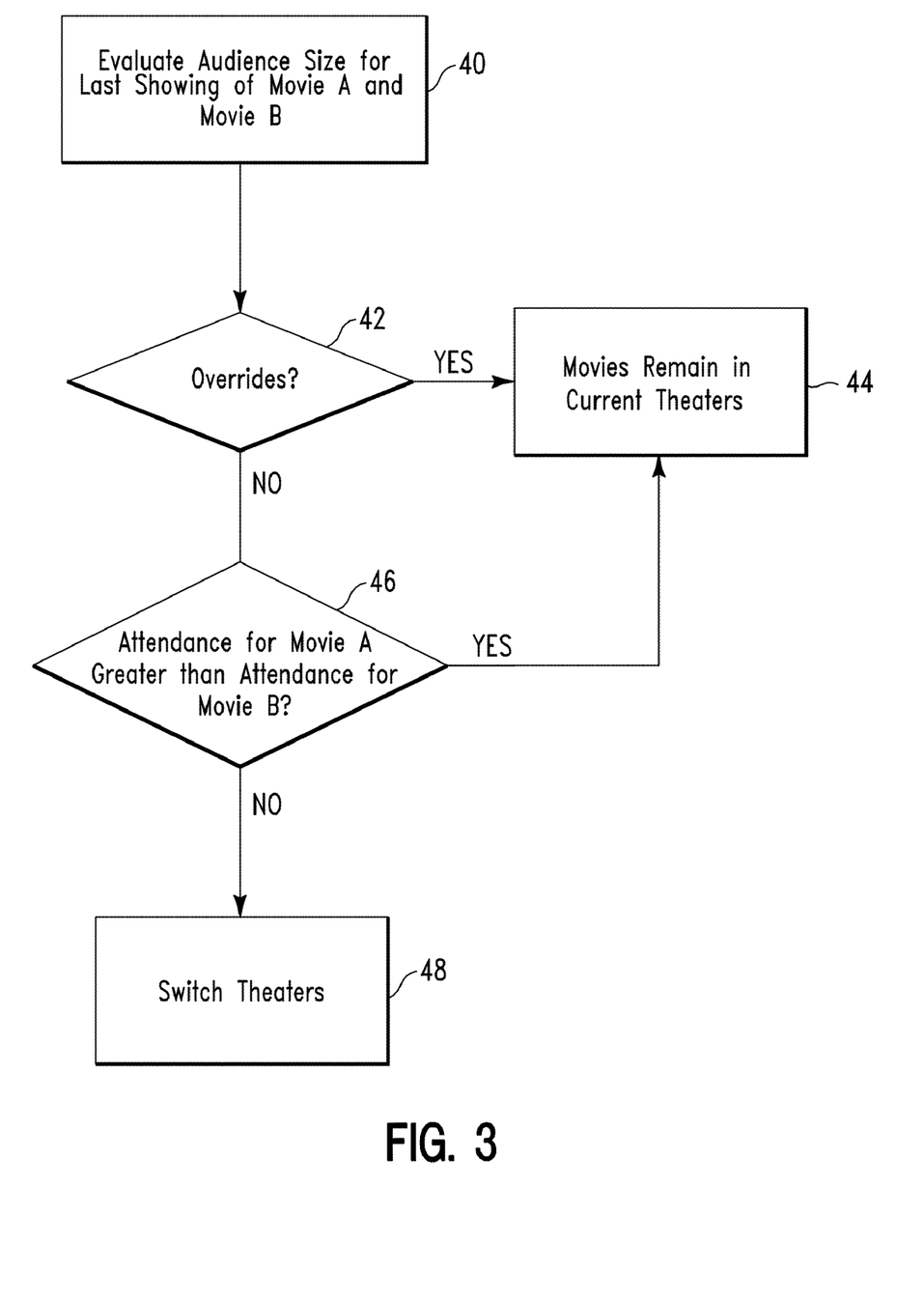
FIG. 3 is an algorithm illustrating an example of a decision making process used by the theater system of FIG. 1 to determine if initially scheduled movies should be reallocated between theaters, in accordance with embodiments of the present invention.

FIG. 3 is an algorithm illustrating an example of a decision making process used by theater system 15 of FIG. 1 to determine if initially scheduled movies should be reallocated between theaters, in accordance with embodiments of the present invention. In this example, a first movie A has been initially scheduled and allocated to theater A comprising an audience capacity of 500 people and a second movie B has been initially scheduled and allocated to theater B comprising an audience capacity of 100 people. A first audience showing for the movie A and the movie B has occurred in accordance with the initial schedule. In step 40, the scheduler tool 9 evaluates audience size data (e.g., from ticket sales) for the first audience showing for the movie A and the first audience showing for the movie B. In step 42, the scheduler tool determines if there are any overrides entered into theater system 15 that would prevent movie A and movie B form being switched between theaters (i.e., theaters A and B). Overrides may comprise a theater out of service override (e.g., a theater may be taken off line for repairs or service), a manager override (e.g., a manager may choose to lock a movie into a certain theater regardless of the scheduling algorithm), a time of day override (e.g., system 15 may override movies such as children's movies based on time of day), etc. If in step 42, it is determined that there are overrides entered into theater system 15 then in step 44 the movies A and B remain in the current theaters (i.e., movie A remains in theater A and movie B remains B in theater B). If in step 42, it is determined that there are no overrides entered into theater system 15 then in step 46 a determination is made based on the evaluation from step 40 as to whether audience attendance for movie A was greater than audience attendance for movie B. If in step 46 it is determined that audience attendance for movie A was greater than audience attendance for movie B then in step 44 the movies A and B remain in the current theaters (i.e., movie A remains in theater A and movie B remains B in theater B). If in step 46 it is determined that audience attendance for movie A was not greater than audience attendance for movie B then in step 48 the movies A and B are transferred between theaters (i.e., movie A is allocated to theater B and movie B is allocated to theater A) so that a predicted larger audience is allocated to a larger theater.

Figure 4:
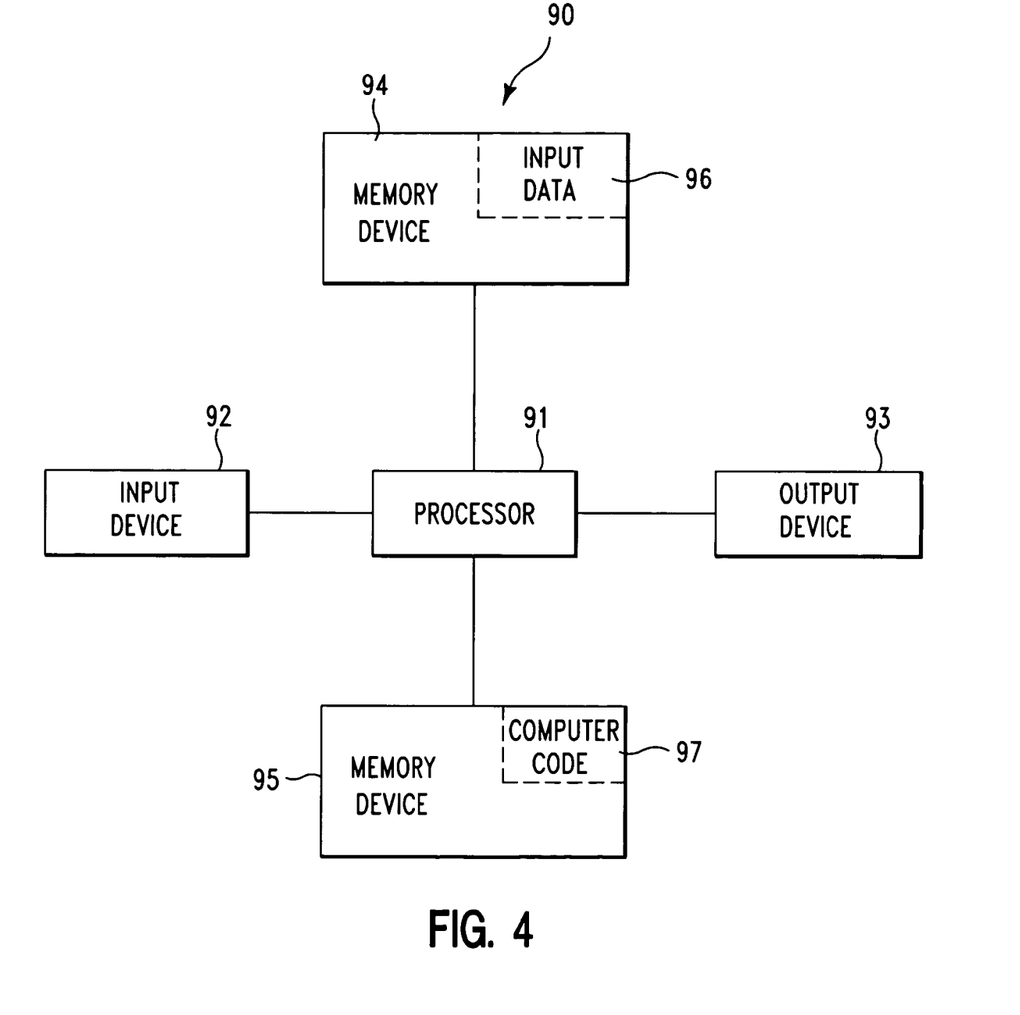
FIG. 4 illustrates a computer system used for implementing the distribution system of FIG. 1 for receiving, storing, scheduling, and broadcasting audio/video data files for multiple audiences, in accordance with embodiments of the present invention.

FIG. 4 illustrates a computer system 90 used for implementing distribution system 2 of FIG. 1 for receiving, storing, scheduling, and broadcasting audio/video data files 5 for multiple audiences, in accordance with embodiments of the present invention. Computer system 90 comprises a processor 91, an input device 92 coupled to processor 91, an output device 93 coupled to processor 91, and memory devices 94 and 95 each coupled to processor 91. Input device 92 may be, inter alia, a keyboard, a mouse, etc. Output device 93 may be, inter alia, a printer, a plotter, a computer screen, a magnetic tape, a removable hard disk, a floppy disk, etc. Memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. Memory device 95 includes a computer code 97. Computer code 97 includes an algorithm for receiving, storing, scheduling, and broadcasting audio/video data files 5 for multiple audiences. Processor 91 executes computer code 97. Memory device 94 includes input data 96. Input data 96 includes input required by computer code 97. Output device 93 displays output from computer code 97. Either or both memory devices 94 and 95 (or one or more additional memory devices not shown in FIG. 4) may comprise audio/video data files 5 and scheduler tool 9 of FIG. 1 and may be used as a computer usable medium (or a computer readable medium or a program storage device) having a computer readable program code embodied therein and/or having other data stored therein, wherein the computer readable program code comprises computer code 97. Generally, a computer program product (or, alternatively, an article of manufacture) of computer system 90 may comprise said computer usable medium (or said program storage device).

Thus the present invention discloses a process for deploying or integrating computing infrastructure, comprising integrating computer-readable code into computer system 90, wherein the code in combination with computer system 90 is capable of performing a method used for receiving, storing, scheduling, and broadcasting audio/video data files 5 for multiple audiences.

While FIG. 4 shows computer system 90 as a particular configuration of hardware and software, any configuration of hardware and software, as would be known to a person of ordinary skill in the art, may be utilized for the purposes stated supra in conjunction with the particular computer system 90 of FIG. 4. For example, memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A distribution system, comprising:

a computing apparatus comprising a scheduler software tool stored on a computer readable storage medium, wherein said computing apparatus is configured to receive from an external audio/video distribution manager via an Internet connection, a plurality of audio/video data files, wherein the computing apparatus is configured to store said plurality of audio/video data files on said computer readable storage medium; and a plurality of projection systems connected to said computing apparatus connected via a wide area network, each projection system of said plurality of projection systems comprising a cache storage device connected to an associated projection apparatus, each said cache storage device being adapted to dynamically receive and store an associated audio/video data file from said plurality of audio/video data files for transmission to each said associated projection apparatus according to a schedule generated by said scheduler software tool based on input data, wherein the computing apparatus is configured to receive said input data associated with said plurality of audio/video data files wherein said input data consists of movie titles for each of said plurality of audio/video data files, time durations for each of said plurality of audio/video data files, and motion picture ratings for each of said plurality of audio/video data files, wherein each said associated audio/video data file is adapted to be initially broadcasted according to said schedule, wherein said computing apparatus further comprises past audience attendance data for audiences associated with past broadcasts for each said associated audio/video data file stored on said computer readable medium, wherein said attendance data consists of data indicating specific age groups and audience ratings associated with said specific age groups, wherein said scheduler software tool is adapted to modify said schedule according to said past attendance data, wherein said modified schedule determines that a first audio/video data file of said audio/video data files should be reallocated from a first cache storage device associated with a first projection system of said plurality of projection systems to a second cache storage device associated with a second projection system of said plurality of projection systems, and wherein said modified schedule determines that a second audio/video data file of said audio/video data files should be reallocated from said second cache storage device to said first cache storage device, and wherein each said cache storage device is further adapted to transfer each said stored associated audio/video data file to each other said cache storage device according to said schedule modified by said scheduler software tool, wherein said first projection system of said projection systems is adapted to broadcast said second audio video file for a first audience, wherein said second projection system of said projection systems is adapted to broadcast said first audio video file for a second audience, wherein audience size data associated with said first audience and said second audience is provided, wherein said scheduler software tool is adapted to determine that said first audio/video data file should be reallocated from said second cache storage device to said first cache storage device and said second audio/video data file should be reallocated from said first cache storage device to said second cache storage device based on said audience size data, wherein said scheduler software tool is adapted to determine that said computing system comprises override data indicating that said first audio/video data file should not be reallocated from said second cache storage device to said first cache storage device and said second audio/video data file should not be reallocated from said first cache storage device to said second cache storage device, wherein said override data consists of an out of service override, a manager override enabled by a manager of said plurality of projection systems, and a time of day override, wherein said first audio/video file consists of a first movie, wherein said second audio/video file consists of a second movie, and wherein said manager override consists of a first command configured to lock said first movie into a first theater comprising said second cache storage device and a second command configured to lock said second movie into a second theater comprising said first cache storage device, and wherein said scheduler software tool is adapted to disable said first audio/video data file from being reallocated from said second cache storage device to said first cache storage device and said second audio/video data file from being reallocated from said first cache storage device to said second cache storage device.

2. The distribution system of claim 1, wherein each said associated projection apparatus is adapted to broadcast each said associated audio/video data file for an associated audience.

3. The distribution system of claim 1, wherein said schedule is generated using data related to each of said plurality of audio/video data files.

4. The distribution system of claim 1, wherein each of said plurality of audio/video data files comprises a different audio/video data file.

5. The distribution system of claim 1, wherein each of said plurality of audio/video data files comprises a same audio/video data file.

6. The distribution system of claim 1, wherein each of said plurality of audio/video data files comprises a digital movie.

7. A distribution method, comprising:

providing a computing apparatus and a plurality of projection systems connected via a wide area network to said computing apparatus, said computing apparatus comprising a scheduler software tool stored on a computer readable storage medium, each projection system of said plurality of projection systems comprising a cache storage device connected to an associated projection apparatus;

receiving, by said computing apparatus from an external audio/video distribution manager via an Internet connection, a plurality of audio/video data files;

storing, on said computer readable storage medium of said computing apparatus, said plurality of audio/video data files;

receiving, by said computing apparatus, input data associated with said plurality of audio/video data files, said input data consisting of movie titles for each of said plurality of audio/video data file, time durations for each of said plurality of audio/video data files, and motion picture ratings for each of said plurality of audio/video data files;

generating by said scheduler software tool based on said input data, a schedule for broadcasting said plurality of audio/video data files;

dynamically receiving and storing by each said cache storage device, an associated audio/video data file from said plurality of audio/video data files according to said schedule;

transmitting by each said cache storage device to each said associated projection apparatus, each said associated audio/video data file according to said schedule;

broadcasting, by each said associated projection apparatus, each said associated audio/video data file according to said schedule;

providing attendance data stored on said computer readable medium, said attendance data related to an audience for each said associated audio/video data file broadcasted during said broadcasting, wherein said attendance data consists of data indicating specific age groups and audience ratings associated with said specific age groups;

determining by a computer processor of said computing system executing said scheduler software tool, that said schedule should be modified based on said attendance data;

modifying by said scheduler software tool in response to results of said determining that said schedule should be modified based on said attendance data, said schedule according to said attendance data, wherein said modifying said schedule results in a modified schedule, wherein said modified schedule determines that a first audio/video data file of said audio/video data files should be reallocated from a first cache storage device associated with a first projection system of said plurality of projection systems to a second cache storage device associated with a second projection system of said plurality of projection systems, and wherein said modified schedule determines that a second audio/video data file of said audio/video data files should be reallocated from said second cache storage device to said first cache storage device;

transferring said first audio/video data file of said audio/video data files from said first cache storage device to said second cache storage device according to said modified schedule;

transferring said second audio/video data file of said audio/video data files from said second cache storage device to said first cache storage device according to said modified schedule;

broadcasting, by said first projection system of said projection systems, said second audio video file for a first audience;

broadcasting, by said second projection system of said projection systems, said first audio video file for a second audience;

providing audience size data associated with said first audience and said second audience;

determining by said scheduler software tool, that said first audio/video data file should be reallocated from said second cache storage device to said first cache storage device and said second audio/video data file should be reallocated from said first cache storage device to said second cache storage device based on said audience size data;

determining by said scheduler software tool, that said computing system comprises override data indicating that said first audio/video data file should not be reallocated from said second cache storage device to said first cache storage device and said second audio/video data file should not be reallocated from said first cache storage device to said second cache storage device, wherein said override data consists of an out of service override, a manager override enabled by a manager of said plurality of projection systems, and a time of day override, wherein said first audio/video file consists of a first movie, wherein said second audio/video file consists of a second movie, and wherein said manager override consists of a first command for locking said first movie into a first theater comprising said second cache storage device and a second command for locking said second movie into a second theater comprising said first cache storage device; and disabling, by said scheduler software tool in response to said override data, said first audio/video data file from being reallocated from said second cache storage device to said first cache storage device and said second audio/video data file from being reallocated from said first cache storage device to said second cache storage device.

8. The method of claim 7, further comprising broadcasting by each said associated projection apparatus each said associated audio/video data file for an associated audience.

9. The method of claim 7, wherein said schedule is generated using data related to each of said plurality of audio/video data files.

10. The method of claim 7, wherein each of said plurality of audio/video data files comprises a different audio/video data file.

11. The method of claim 7, wherein each of said plurality of audio/video data files comprises a same audio/video data file.

12. The method of claim 7, wherein each of said plurality of audio/video data files comprises a digital movie.

13. A process for integrating computing infrastructure, comprising integrating computer-readable code into a computer system, wherein the code comprises a scheduler software tool, wherein the computer system comprises a computing apparatus and a plurality of projection systems connected to said computing apparatus via a wide area network, wherein the computing apparatus comprises said scheduler software tool on a computer readable storage medium, wherein each projection system of said plurality of projection systems comprises a cache storage device connected to an associated projection apparatus, and wherein the code in combination with the computer system is capable of performing a method comprising:

receiving, by said computing apparatus from an external audio/video distribution manager via an Internet connection, a plurality of audio/video data files;

storing, on said computer readable storage medium of said computing apparatus, said plurality of audio/video data files;

receiving, by said computing apparatus, input data associated with said plurality of audio/video data files, said input data consisting of movie titles for each of said plurality of audio/video data file, time durations for each of said plurality of audio/video data files, and motion picture ratings for each of said plurality of audio/video data files;

generating by said scheduler software tool based on said input data, a schedule for broadcasting said plurality of audio/video data files;

dynamically receiving and storing by each said cache storage device, an associated audio/video data file from said plurality of audio/video data files according to said schedule;

transmitting by each said cache storage device to each said associated projection apparatus, each said associated audio/video data file according to said schedule;

broadcasting, by each said associated projection apparatus, each said associated audio/video data file according to said schedule;

providing attendance data stored on said computer readable medium, said attendance data related to an audience for each said associated audio/video data file broadcasted during said broadcasting, wherein said attendance data consists of data indicating specific age groups and audience ratings associated with said specific age groups;

determining by a computer processor of said computing system executing said scheduler software tool, that said schedule should be modified based on said attendance data;

modifying by said scheduler software tool in response to results of said determining that said schedule should be modified based on said attendance data, said schedule according to said attendance data, wherein said modifying said schedule results in a modified schedule, wherein said modified schedule determines that a first audio/video data file of said audio/video data files should be reallocated from a first cache storage device associated with a first projection system of said plurality of projection systems to a second cache storage device associated with a second projection system of said plurality of projection systems, and wherein said modified schedule determines that a second audio/video data file of said audio/video data files should be reallocated from said second cache storage device to said first cache storage device;

transferring said first audio/video data file of said audio/video data files from said first cache storage device to said second cache storage device according to said modified schedule;

transferring said second audio/video data file of said audio/video data files from said second cache storage device to said first cache storage device according to said modified schedule;

broadcasting, by said first projection system of said projection systems, said second audio video file for a first audience;

broadcasting, by said second projection system of said projection systems, said first audio video file for a second audience;

providing audience size data associated with said first audience and said second audience;

determining by said scheduler software tool, that said first audio/video data file should be reallocated from said second cache storage device to said first cache storage device and said second audio/video data file should be reallocated from said first cache storage device to said second cache storage device based on said audience size data;

determining by said scheduler software tool, that said computing system comprises override data indicating that said first audio/video data file should not be reallocated from said second cache storage device to said first cache storage device and said second audio/video data file should not be reallocated from said first cache storage device to said second cache storage device, wherein said override data consists of an out of service override, a manager override enabled by a manager of said plurality of projection systems, and a time of day override, wherein said first audio/video file consists of a first movie, wherein said second audio/video file consists of a second movie, and wherein said manager override consists of a first command for locking said first movie into a first theater comprising said second cache storage device and a second command for locking said second movie into a second theater comprising said first cache storage device; and disabling, by said scheduler software tool in response to said override data, said first audio/video data file from being reallocated from said second cache storage device to said first cache storage device and said second audio/video data file from being reallocated from said first cache storage device to said second cache storage device.

14. The process of claim 13, wherein said method further comprises:
broadcasting by each said associated projection apparatus each said associated audio/video data file for an associated audience.

15. The process of claim 13, wherein said schedule is generated using data related to each of said plurality of audio/video data files.

16. The process of claim 13, wherein each of said plurality of audio/video data files comprises a different audio/video data file.

17. The process of claim 13, wherein each of said plurality of audio/video data files comprises a same audio/video data file.

18. The process of claim 13, wherein each of said plurality of audio/video data files comprises a digital movie.

19. A computer program product, comprising a computer usable readable storage device having a computer readable program code embodied therein, said computer readable program code comprising a scheduler software tool and an algorithm adapted to implement a distribution method within a computing system, said computing system comprising a computing apparatus and a plurality of projection systems connected to said computing apparatus via a wide area network, wherein the computing apparatus comprises said scheduler software tool and a plurality of audio/video data files stored on a computer readable medium storage device, wherein each projection system of said plurality of projection systems comprises a cache storage device connected to an associated projection apparatus, said method comprising:

receiving, by said computing apparatus from an external audio/video distribution manager via an Internet connection, a plurality of audio/video data files; storing, on said computer readable storage device of said computing apparatus, said plurality of audio/video data files; receiving, by said computing apparatus, input data associated with said plurality of audio/video data files, said input data consisting of movie titles for each of said plurality of audio/video data file, time durations for each of said plurality of audio/video data files, and motion picture ratings for each of said plurality of audio/video data files:

generating by said scheduler software tool based on said input data, a schedule for broadcasting said plurality of audio/video data files; dynamically receiving and storing by each said cache storage device, an associated audio/video data file from said plurality of audio/video data files according to said schedule;

transmitting by each said cache storage device to each said associated projection apparatus, each said associated audio/video data file according to said schedule;

broadcasting, by each said associated projection apparatus, each said associated audio/video data file according to said schedule;

providing attendance data stored on said computer readable medium, said attendance data related to an audience for each said associated audio/video data file broadcasted during said broadcasting, wherein said attendance data consists of data indicating specific age groups and audience ratings associated with said specific age groups;

determining by a computer processor of said computing system executing said scheduler software tool, that said schedule should be modified based on said attendance data;

modifying by said scheduler software tool in response to results of said determining that said schedule should be modified based on said attendance data, said schedule according to said attendance data, wherein said modifying said schedule results in a modified schedule, wherein said modified schedule determines that a first audio/video data file of said audio/video data files should be reallocated from a first cache storage device associated with a first projection system of said plurality of projection systems to a second cache storage device associated with a second projection system of said plurality of projection systems, and wherein said modified schedule determines that a second audio/video data file of said audio/video data files should be reallocated from said second cache storage device to said first cache storage device;

transferring said first audio/video data file of said audio/video data files from said first cache storage device to said second cache storage device according to said modified schedule;

transferring said second audio/video data file of said audio/video data files from said second cache storage device to said first cache storage device according to said modified schedule;

broadcasting, by said first projection system of said projection systems, said second audio video file for a first audience;

broadcasting, by said second projection system of said projection systems, said first audio video file for a second audience;

providing audience size data associated with said first audience and said second audience; determining by said scheduler software tool, that said first audio/video data file should be reallocated from said second cache storage device to said first cache storage device and said second audio/video data file should be reallocated from said first cache storage device to said second cache storage device based on said audience size data;

determining by said scheduler software tool, that said computing system comprises override data indicating that said first audio/video data file should not be reallocated from said second cache storage device to said first cache storage device and said second audio/video data file should not be reallocated from said first cache storage device to said second cache storage device, wherein said override data consists of an out of service override, a manager override enabled by a manager of said plurality of projection systems and a time of day override, wherein said first audio/video file consists of a first movie, wherein said second audio/video file consists of a second movie, and wherein said manager override consists of a first command for locking said first movie into a first theater comprising said second cache storage device and a second command for locking said second movie into a second theater comprising said first cache storage device; and disabling, by said scheduler software tool in response to said override data, said first audio/video data file from being reallocated from said second cache storage device to said first cache storage device and said second audio/video data file from being reallocated from said first cache storage device to said second cache storage device.

20. The computer program product of claim 19, wherein said method further comprises:
broadcasting by each said associated projection apparatus each said associated audio/video data file for an associated audience.

21. The computer program product of claim 19, wherein said schedule is generated using data related to each of said plurality of audio/video data files.

22. The computer program product of claim 19, wherein each of said plurality of audio/video data files comprises a different audio/video data file.

23. The computer program product of claim 19, wherein each of said plurality of audio/video data files comprises a same audio/video data file.

24. The computer program product of claim 19, wherein each of said plurality of audio/video data files comprises a digital movie.

25. The method of claim 7, wherein each said associated projection apparatus comprises a digital decoding means, wherein each said audio/video data file comprises a digital audio/video data file, and wherein said method further comprises:
decoding, by each said digital decoding means, each said digital audio/video data file.

26. The method of claim 7, wherein said computing apparatus comprises a digital decoding means, wherein each said audio/video data file comprises a digital audio/video data file, and wherein said method further comprises:
decoding, by computing apparatus, each said digital audio/video data file.

* * * * *